US008870139B1

(12) United States Patent
Port et al.

(10) Patent No.: US 8,870,139 B1
(45) Date of Patent: Oct. 28, 2014

(54) STRAP MOUNT FOR SOLAR PANELS

(76) Inventors: Jonathan Port, Los Angeles, CA (US); Timothy Graves, San Diego, CA (US)

( * ) Notice: Subject to any disclaimer, the term of this patent is extended or adjusted under 35 U.S.C. 154(b) by 646 days.

(21) Appl. No.: 13/038,286

(22) Filed: Mar. 1, 2011

(51) Int. Cl.
*E04D 13/18* (2014.01)
*F24J 2/52* (2006.01)

(52) U.S. Cl.
CPC ..................... *F24J 2/5241* (2013.01)
USPC .......................... 248/237; 52/173.3

(58) Field of Classification Search
CPC ................... F24J 2/52; F24J 2/5241
USPC ............. 248/237, 148, 201, 220.21, 229.17, 248/228.8, 230.8, 499, 500, 200, 505, 154, 248/346.01, 146; 52/173.3; 136/243–293; 211/41.1; 410/97–98
See application file for complete search history.

(56) References Cited

U.S. PATENT DOCUMENTS 6,495,750 B1 * 12/2002 Dinwoodie ............... 136/251
7,806,377 B2 * 10/2010 Strizki ....................... 248/200
8,281,524 B2 * 10/2012 Hund et al. .................. 52/173.3
2009/0302183 A1 * 12/2009 Strizki ......................... 248/309.1
2011/0197944 A1 * 8/2011 Hund et al. ................... 136/244
2011/0314751 A1 * 12/2011 Jette ............................... 52/173.3
2012/0285515 A1 * 11/2012 Sagayama .................... 136/251
2013/0000219 A1 * 1/2013 Kudav et al. ..................... 52/84
2013/0112248 A1 * 5/2013 McPheeters ................. 136/251

* cited by examiner

*Primary Examiner* — Terrell McKinnon
*Assistant Examiner* — Ingrid M Weinhold
(74) *Attorney, Agent, or Firm* — Norton R. Townsley; Belasco Jacobs & Townsley, LLP

(57) ABSTRACT

A novel solar panel mounting system including a strap and one or more supports, having top flanges, attached to each other. The strap is attached between a first point and a second point on a surface. The support is designed to support a solar panel on this surface. The top flange of the support may be parallel to or at an angle to the surface. The strap may be singular or comprised of two straps one above the other. The strap may be attached to the top flange or the bottom or both. The supports may have any cross sectional shape. The strap may be attached to the support at its end or at a distance from the end; or normal to the support or at an angle to it. The length of the support is greater than the width of the strap.

56 Claims, 17 Drawing Sheets

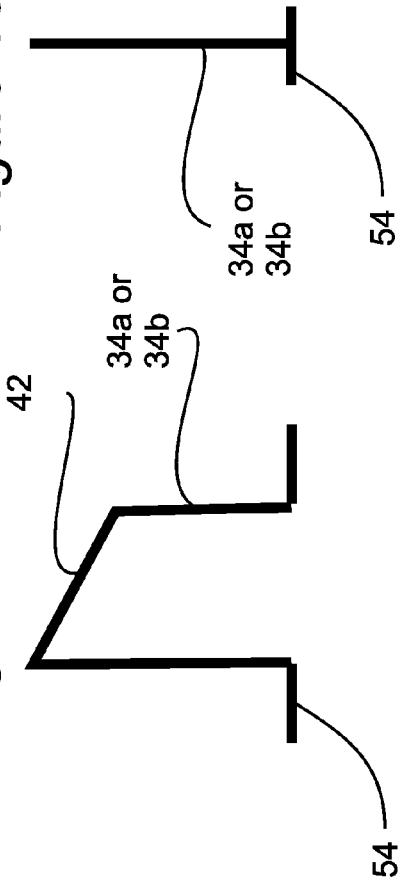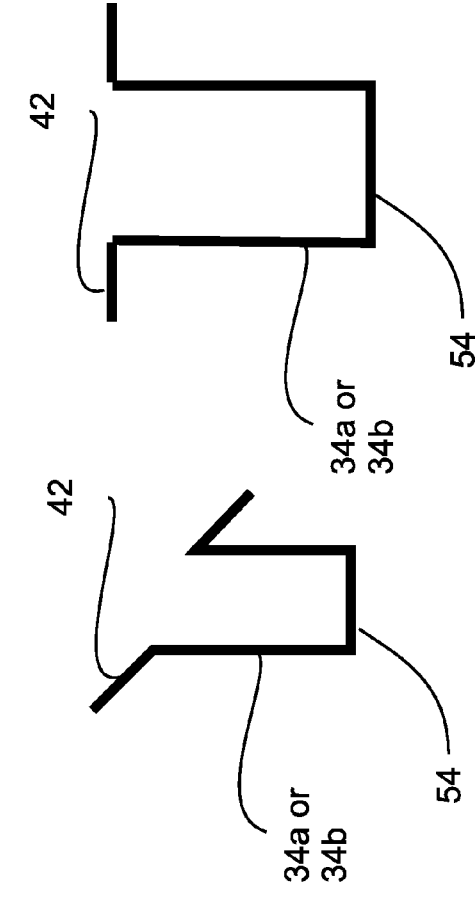

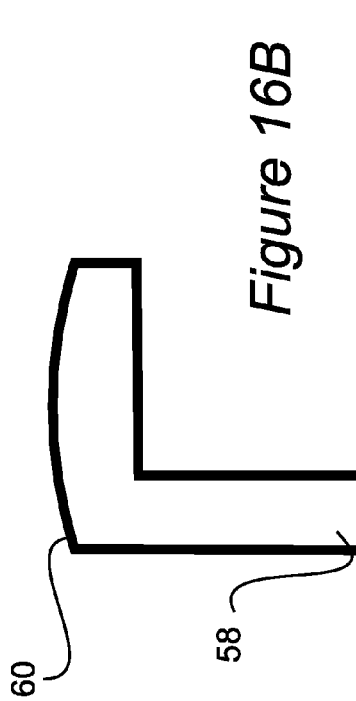
Figure 16B
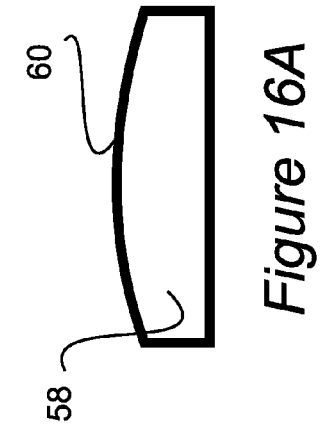
Figure 16A
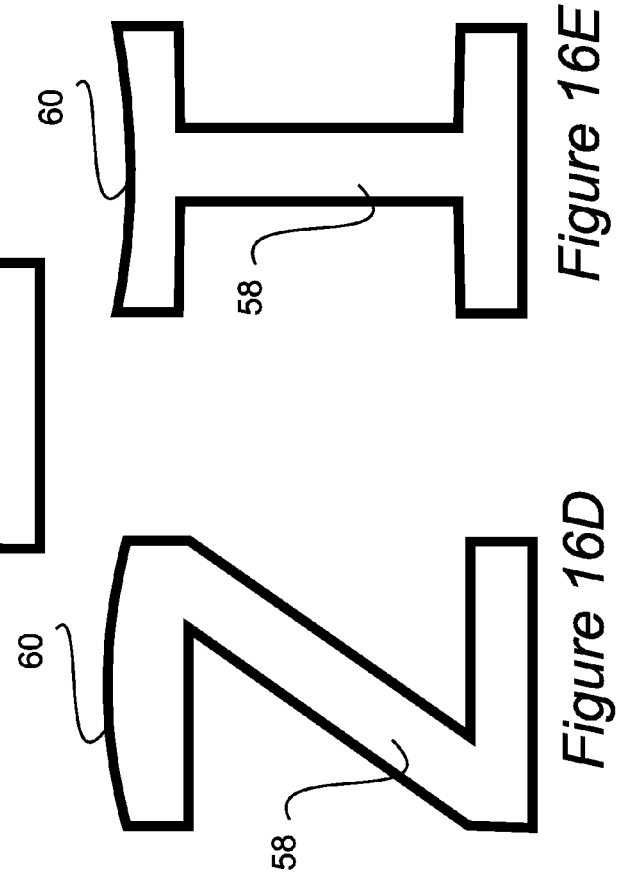
Figure 16D
Figure 16E
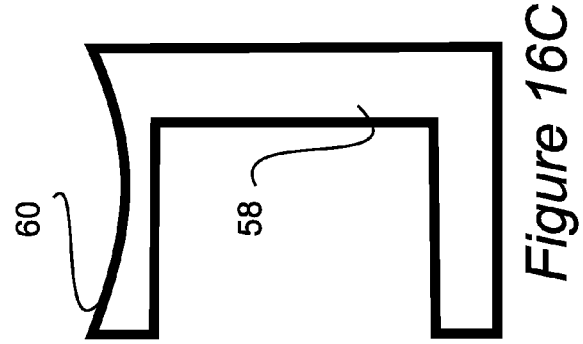
Figure 16C

STRAP MOUNT FOR SOLAR PANELS

BACKGROUND OF THE INVENTION (1) Field of the Invention

The present invention relates to the field of solar panels and more particularly to apparatuses and methods for mounting solar panels on surfaces, including roofs, walls and the ground.

(2) Description of the Related Art

Solar panels must be mounted correctly in order to maximizing power production, to prevent movement of the panels from the force of wind. The proper solar panel mounting provides stability and the proper directional and latitudinal orientation for the solar array.

Different mounting systems are available depending on whether the modules will be mounted on a roof, a wall, the ground, or a pole. For mounting on a roof or the ground there are ballast mounts, flush mounts (such as Modular IronRidge XRS available from IronRidge in Willits, Calif.) standing seams mounts, and adjustable mounts (such as those available from Unirac in Albuquerque, N. Mex.). These usually include a tilted rack, firmly attached to the substrate surface, on which the modules are firmly mounted; or brackets of at least two different heights, firmly attached to the substrate surface, to which the ends of the modules are firmly attached.

Such systems are heavy and expensive to fabricated and time consuming to install. What is needed is a mounting system which is cheaper to fabricate and less time consuming to install. Preferably the improved system can be easily fabricated on site or provided as a kit.

Development of a solar panel mounting system which is cheaper to fabricate and less time consuming to install represents a great improvement in the field of solar panel mounting and satisfies a long felt need of the solar panel installer and owner.

SUMMARY OF THE INVENTION

The present invention is a novel solar panel mounting system. It includes a strap and a support attached to each other. The strap is attached between a first point on a surface and a second point on a surface. The points are spaced apart from each other. The support is designed to support a solar panel on the surface, between the upper and lower sides of the solar panel. The support has a top flange, a bottom and an end.

The mounting system may be fabricated on site or provided as a kit. First the strap and support are fabricated. Then the strap is attached to the surface and the support is attached to the strap.

The top flange may be parallel to the surface or at an angle to the surface. The strap may be attached to the top flange or the bottom. Alternatively the strap may comprise a first strap above a second strap. In this case the first strap is attached to the top flange and the seconds strap is attached to the bottom. In addition the support may comprise a first support and a second support spaced apart from each other.

The supports may have any cross sectional shape, including, Z, C, Π, inverted Π, inverted T, and I. The strap may be attached to the support at its end or at a distance from the end. The strap may be attached to the support normal to the support or at an angle to it. The length of the support is greater than the width of the strap. The cross section of the strap may be rectangular or have any shape such as a C, Z or I. In addition, the top surface of the strap may be curved up or down.

This invention, therefore, is a solar panel mounting system which is cheaper to fabricate and less time consuming to install. The advantages of this invention installation are decreasing the number of attachment points, transfer of loads by use of the straps or cables, and faster installation with fewer parts. This invention provides less wind resistance and uplift. This improved system can be easily fabricated on site or provided as a kit.

An appreciation of the other aims and objectives of the present invention and an understanding of it may be achieved by referring to the accompanying drawings and description of a preferred embodiment.

BRIEF DESCRIPTION OF THE DRAWINGS

The supports in FIGS. 1-12 are all zig-zag shaped. FIGS. 13A-13D illustrate various other shapes that the supports can have.

FIG. 13A illustrates a support with a C shape.

FIG. 13B illustrates a support with an angled Π shape.

FIG. 13C illustrates a support with an inverted T shape.

FIG. 13D illustrates a support with an angled I shape.

FIG. 13E illustrates a support with an inverted, angled Π shape.

FIG. 13F illustrates a support with an inverted Π shape.

FIG. 16A is a cross sectional view of a strap having a rectangular cross section and a concave top surface.

FIG. 16B is a cross sectional view of a strap having a C-shaped cross section and a concave top surface.

FIG. 16C is a cross sectional view of a strap having a reverse C-shaped cross section and a convex top surface.

FIG. 16D is a cross sectional view of a strap having a Z-shaped cross section and a concave top surface.

FIG. 16E is a cross sectional view of a strap having an I-shaped cross section and a convex top surface.

DETAILED DESCRIPTION OF THE PREFERRED EMBODIMENT

Figure 1:
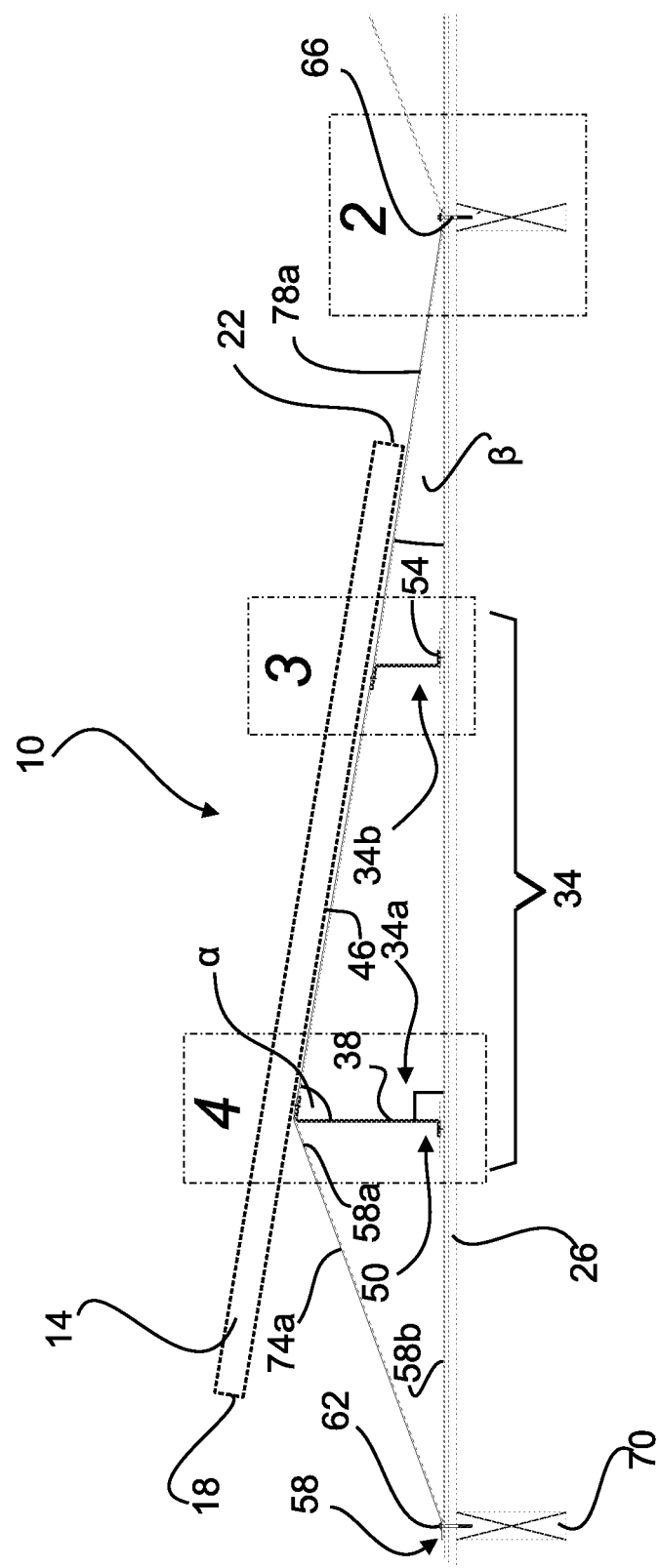
FIG. 1 is a side, cross sectional view of slightly more than one unit of one embodiment of this invention installed on a surface and supporting a solar panel. This embodiment has a top strap and a bottom strap and two supports and is attached to the surface joists.
Figure 2:
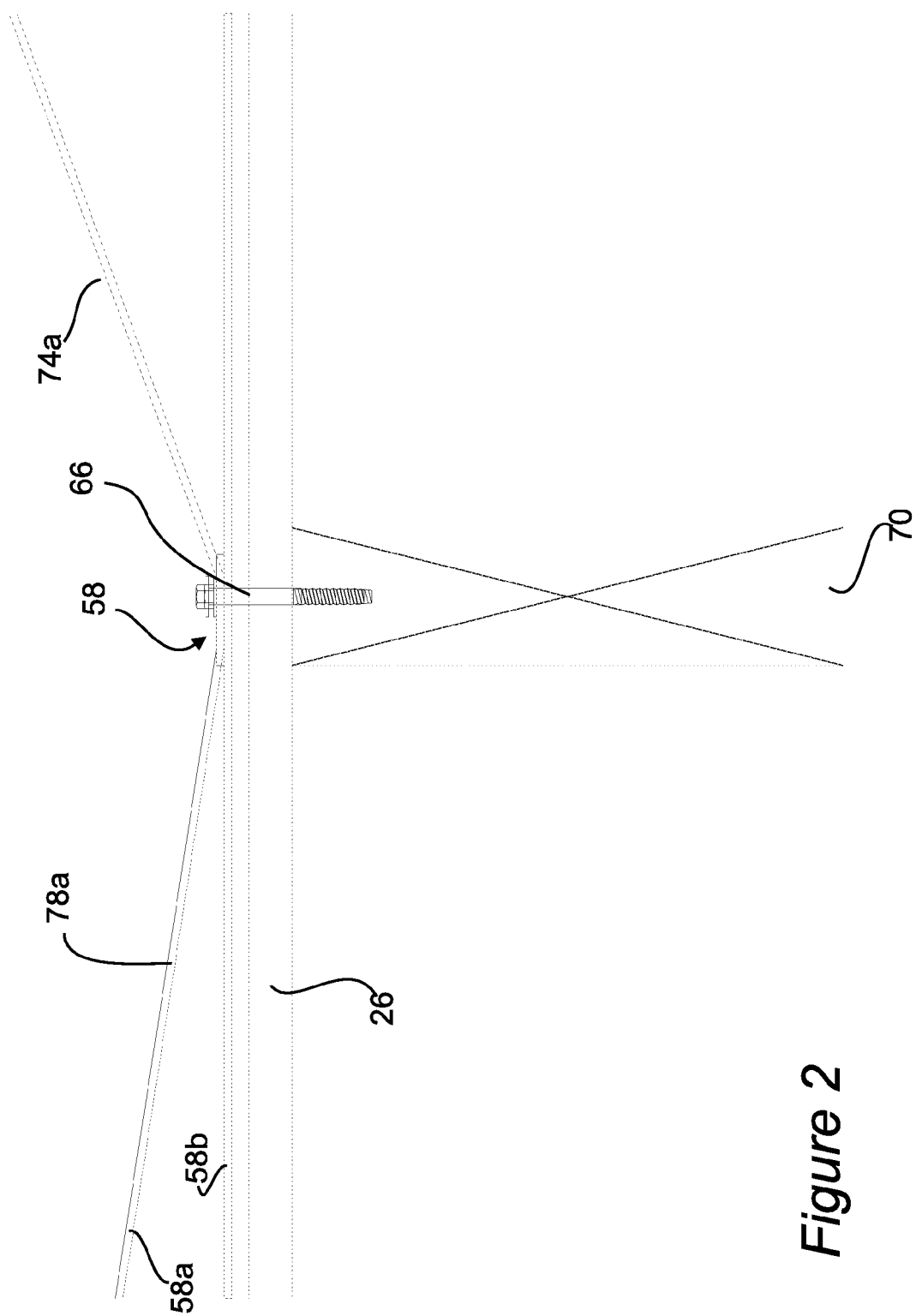
FIG. 2 is an enlarged view of the area indicated by the rectangle 2 on FIG. 1.
Figure 3:
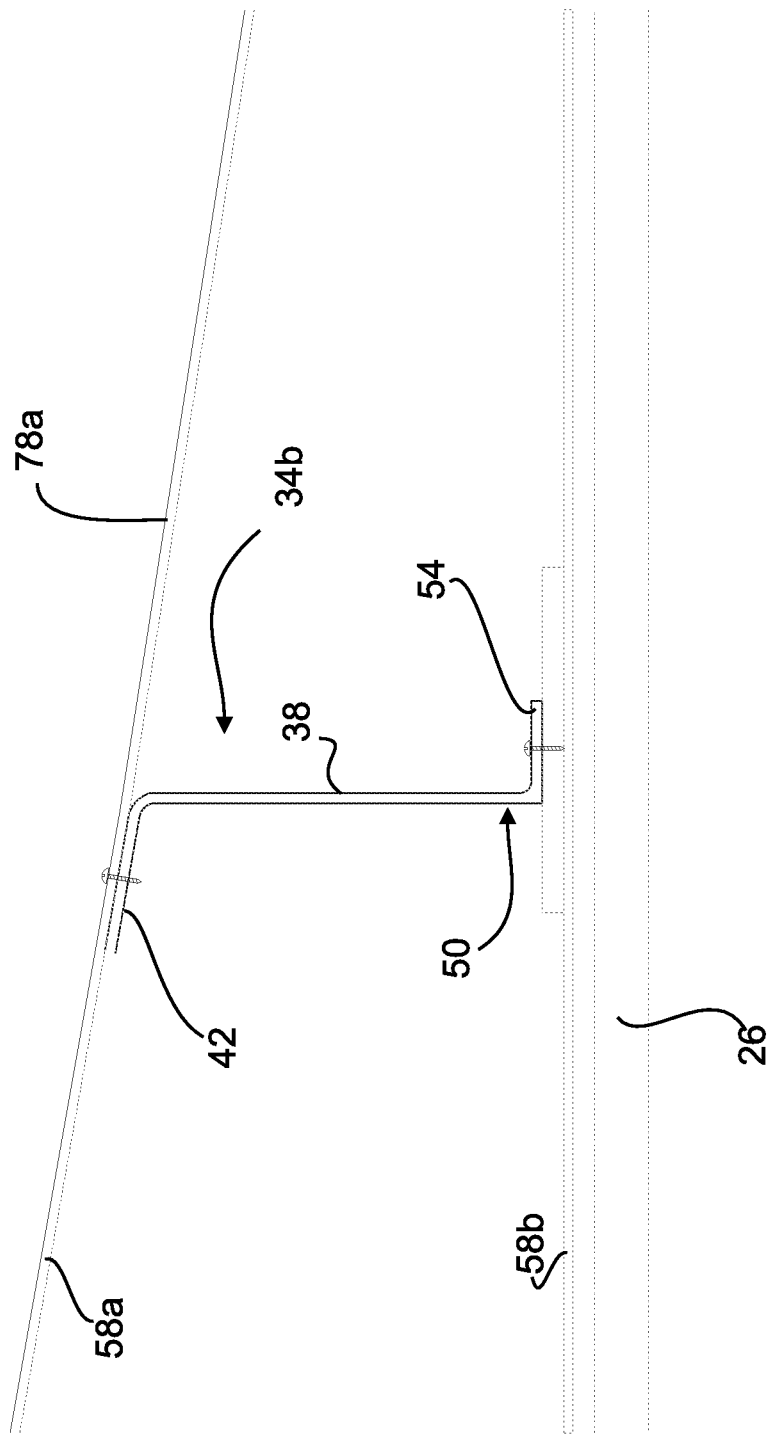
FIG. 3 is an enlarged view of the area indicated by the rectangle 3 on FIG. 1.
Figure 4:
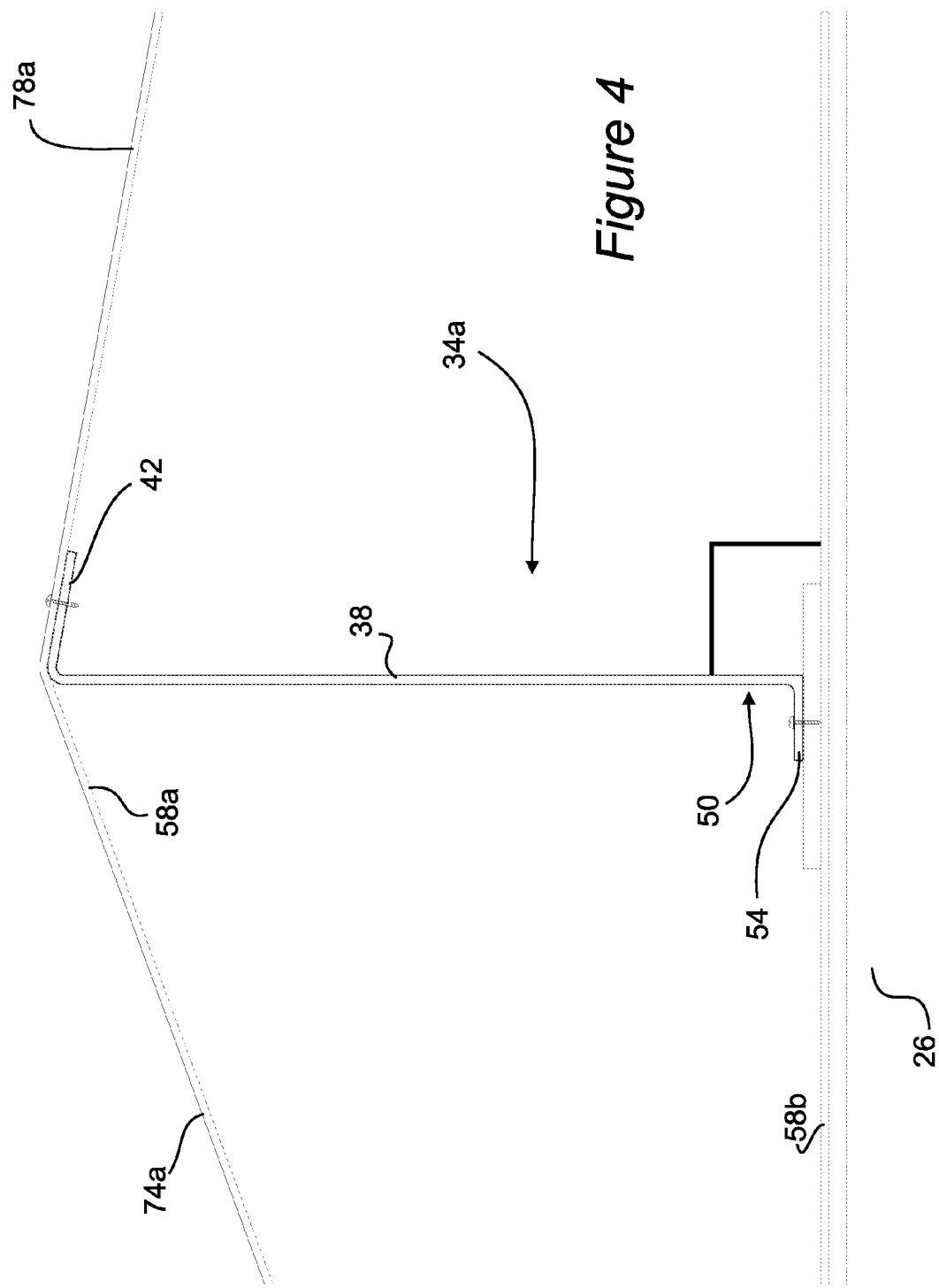
FIG. 4 is an enlarged view of the area indicated by the rectangle 4 on FIG. 1.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIGS. 1, 2, 3 and 4 illustrate the main features of this invention 10. This invention is an apparatus and method for mounting solar panels 14 on a surface. Solar panels 14 have an upper side 18 and a lower side 22. Depending on orientation, the sides 18, 22 can be the lengths or widths of the panels 14. Surfaces on which this invention can be used include roofs 26, walls and the ground 30.

The invention includes a support 34 supporting each solar panel 14 to the surface. The support 34 is located between the upper 18 and lower sides 22 of each solar panel 14. Preferably the supports 34 have at least one central member 38 and a top flange 42. The top flange 42 can be parallel to or at an angle to the surface. If angled, the angle α between the top flange 42 and the central member 38 is the complement of the angle β between the surface and the bottom 46 of the solar panel 14. The angle β is preferably 45° or less.

This invention also includes a strap 58 attached between a first point 62 and a second point 66 on the surface. The first 62 and second 66 points are spaced apart from each other on either side of the support 34. Preferably, in buildings, the invention is designed so that attachment of the strap 58 to the roof 26 or wall at the points 62, 66 is over a roof joist 70 or beam so that attachment is made through the roof 26 and into the joist 70 or through the wall and into the beam. Preferably such attachment is made by screws, bolts, or studs.

Figure 5:
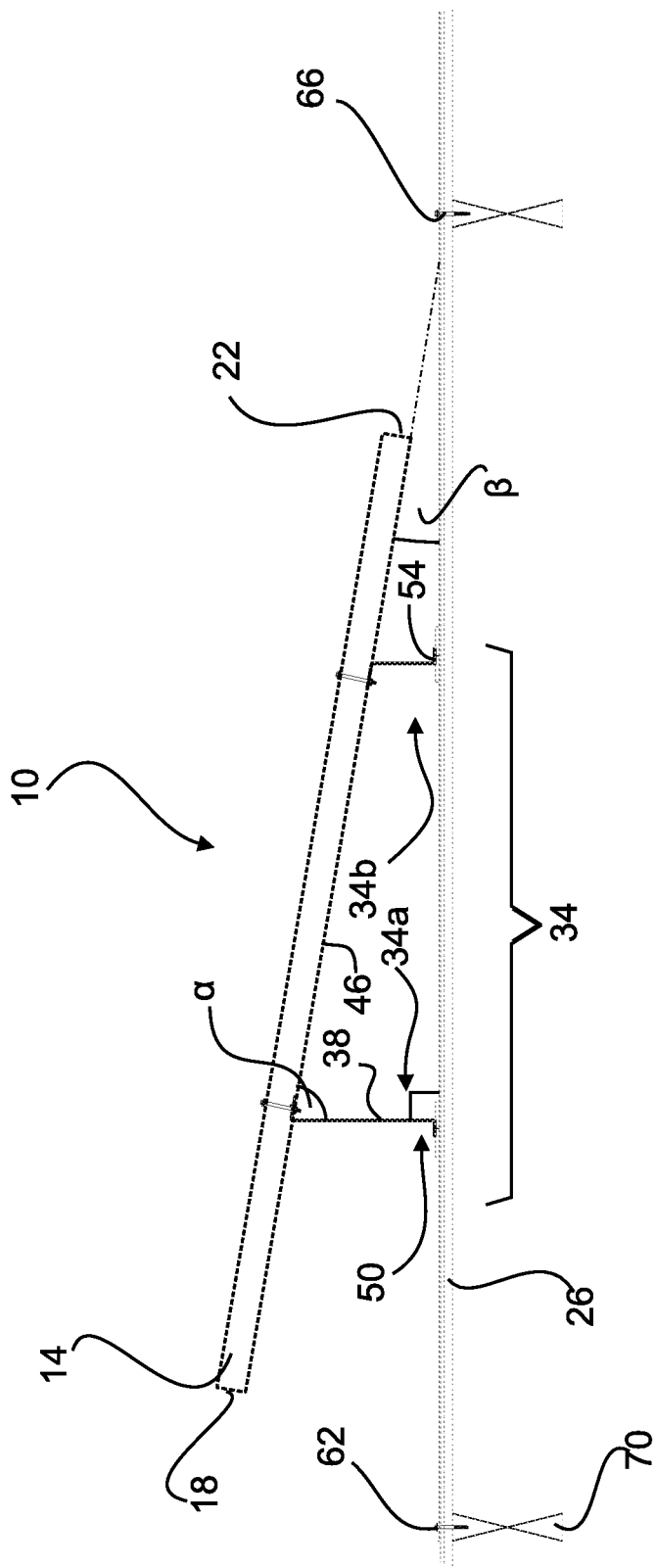
FIG. 5 is a side, cross sectional view of one unit of this another embodiment of this invention. This embodiment has a bottom strap and two supports.
Figure 6:
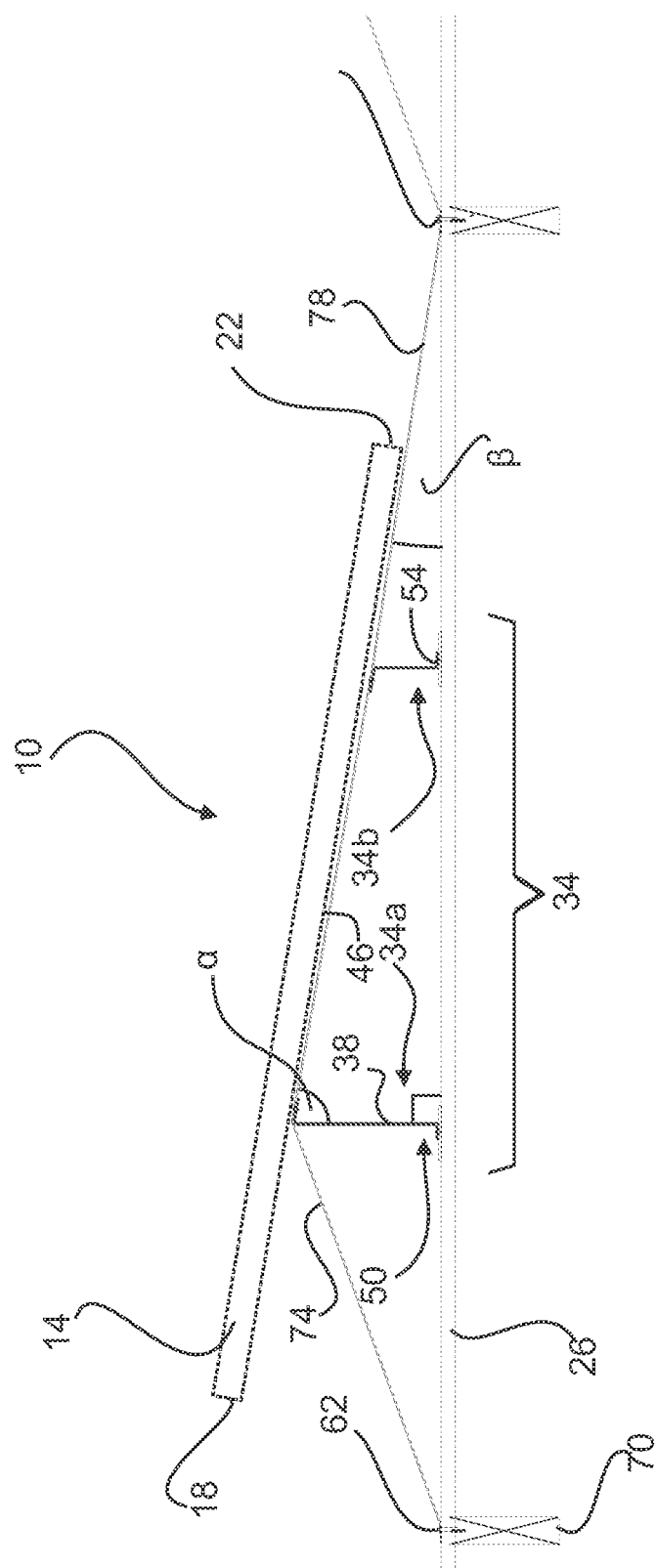
FIG. 6 is a side, cross sectional view of slightly more than one unit of yet another embodiment of this invention installed on a surface and supporting a solar panel. This embodiment has a top strap and two supports.

The strap 58 can be attached to the top flange 42, as shown in FIG. 6, or the bottom 50 of the support 34, as shown in FIG. 5. In the former case, the strap will have a steeply pitched section 74 and a gently pitched section 78. But the strap 58 can comprise a top or first strap 58a over a bottom or second strap 58b, as shown in FIGS. 1-4. In this case the top strap 58a is attached to the top flange 42 (and will have a steeply pitched section 74a and a gently pitched section 78a) and the bottom strap 58b is attached to the bottom 50 of the support 34. Attachment to the top flange 42 can be by and convenient means such as screws, bolts, studs, clamps or welding. Many different ways can be conceived of attaching the bottom 50 of each support 34 to bottom strap 58b. Perhaps, the simplest is via a bottom flange 54 attached to the central member 38. Fastening may be via screw, bolt, stud, adhesive, clamping, welding, etc. In addition, the bottom 50 of each support 34 may be attached to the surface.

The support 34 can comprise two supports, a peak support 34a and an intermediate support 34b spaced apart from each other, as shown in FIGS. 1, 3, 4, 5, 6 and 7. The supports 34a 34b can be provided with weep holes 76 to allow drainage and prevent water from collecting and stagnating. In windy areas, the supports can be provided with pressure relief holes (not illustrated) to prevent wind from blowing them off the surface.

Figure 7:
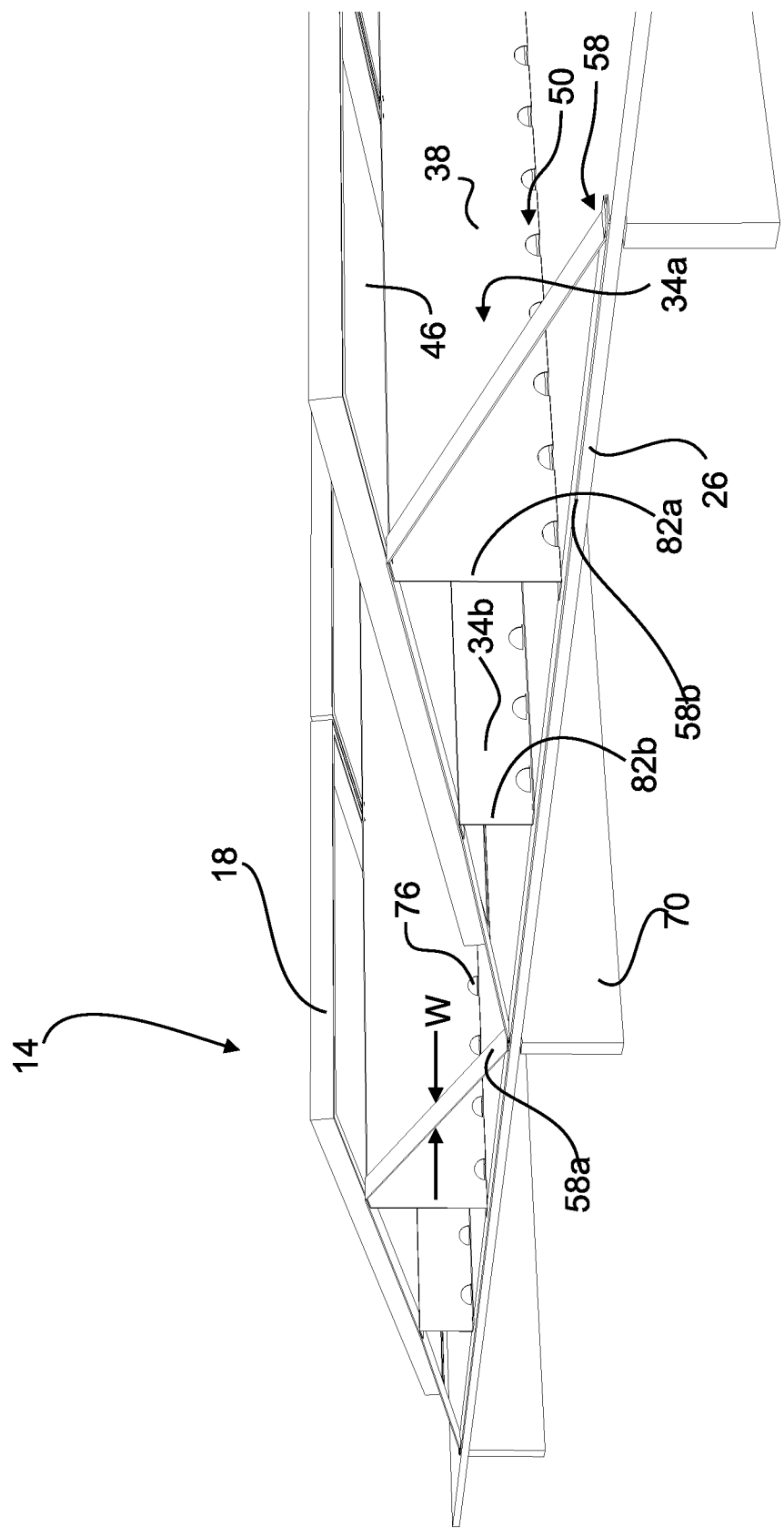
FIG. 7 is a perspective view of an embodiment of this invention installed on a surface for support of a solar panel array from one angle.
Figure 8:
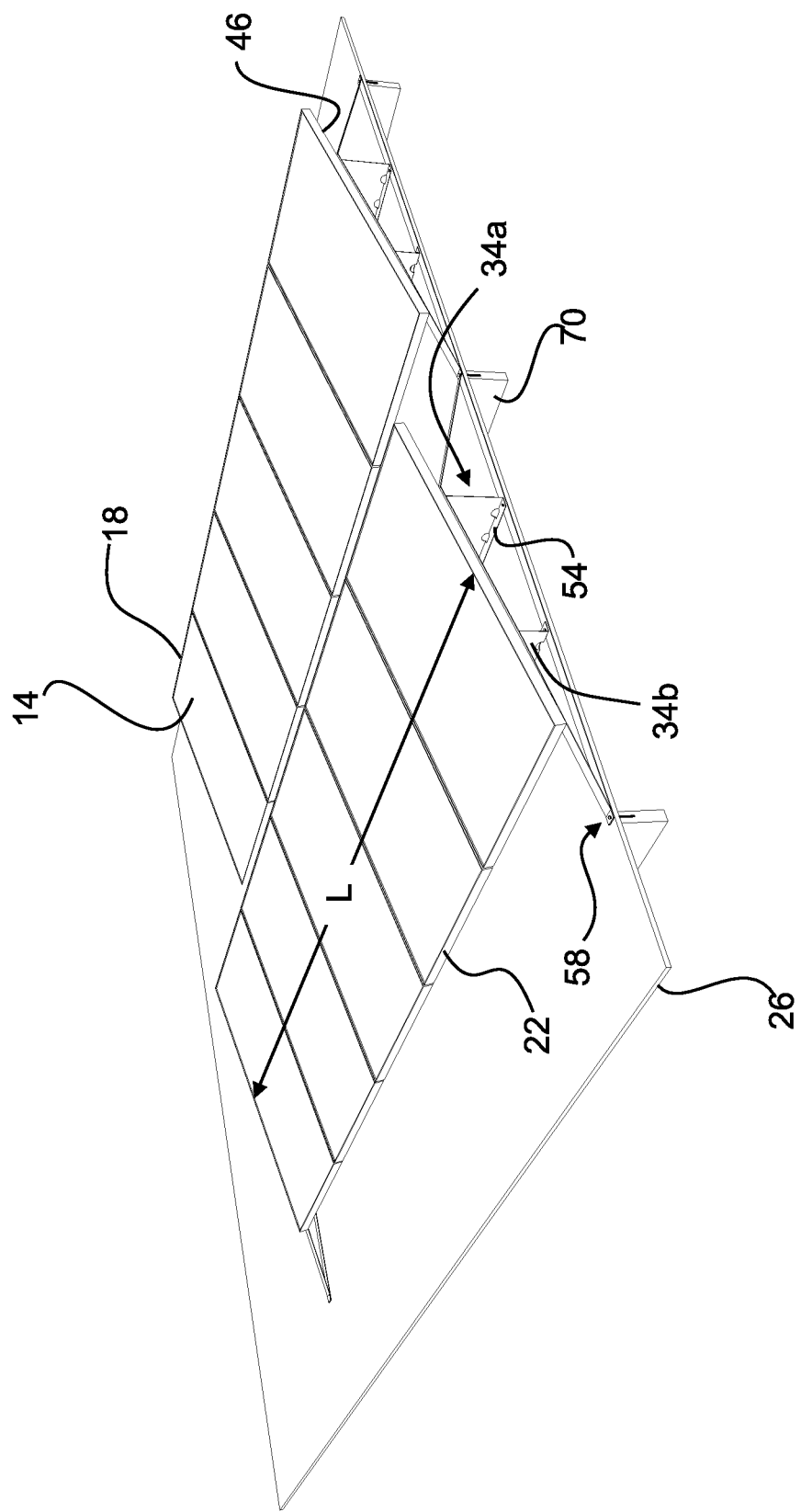
FIG. 8 is a perspective view of this invention installed on a surface for support of a solar panel array from another angle.

Preferably the straps 58a, 58b are a few inches wide W and made of metal. In fact, the straps 58a, 58b could be metal cable. On the other hand the lengths L of the peak and intermediate supports must be at least as long as the width or length of the solar panels, depending on the orientation. In fact they may be multiples of the width or length of the solar panels. FIGS. 7 and 8 illustrate the widths of the straps and the lengths of the supports. The solar panels are preferably attached to the top flanges 42 of the supports 34, 34a, 34b.

Figure 15E:
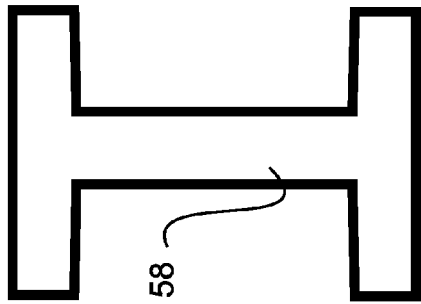
FIG. 15E is a cross sectional view of a strap having an I-shaped cross section.
Figure 15B:
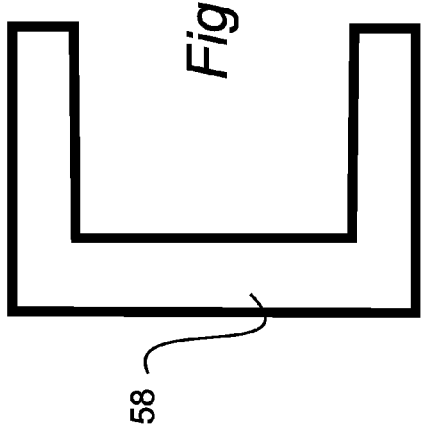
FIG. 15B is a cross sectional view of a strap having a C-shaped cross section.
Figure 15D:
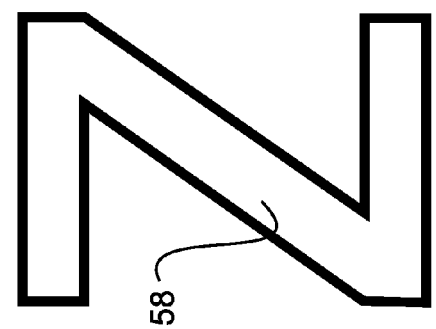
FIG. 15D is a cross sectional view of a strap having a Z-shaped cross section.
Figure 15A:
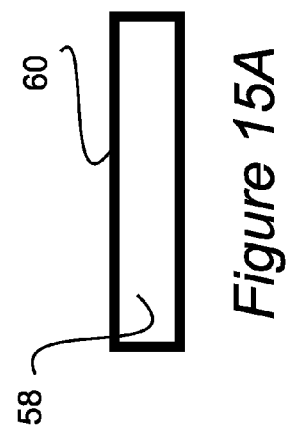
FIG. 15A is a cross sectional view of a strap having a rectangular cross section.

The cross sections of the straps 58 do not have to be rectangular as shown in FIG. 15A. They could alternatively have any cross sectional shape. Some examples are shown in FIGS. 15B-15E.

FIG. 15B illustrates a strap having a C-shaped cross section.

Figure 15C:
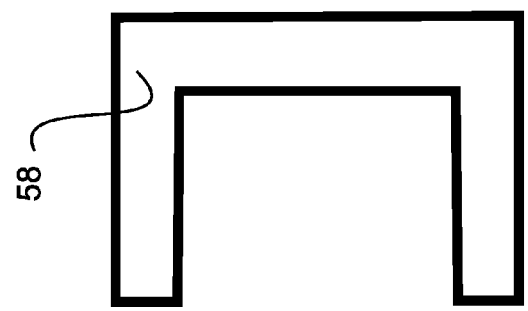
FIG. 15C is a cross sectional view of a strap having a reverse C-shaped cross section.

FIG. 15C illustrates a strap having a reverse C-shaped cross section.

FIG. 15D illustrates a strap having a Z-shaped cross section.

FIG. 15E illustrates a strap having an I-shaped cross section.

Moreover, the top surfaces 60 of the straps 58 could be curved rather than flat as illustrated in FIG. 15A. Some examples are shown in FIGS. 16A-16E. FIGS. 16A, 16B, and 16D illustrate concave surfaces 60 while FIGS. 16C and 16E illustrate convex surfaces 60. Other surfaces of the straps 58 could be curved similarly.

Figure 9A:
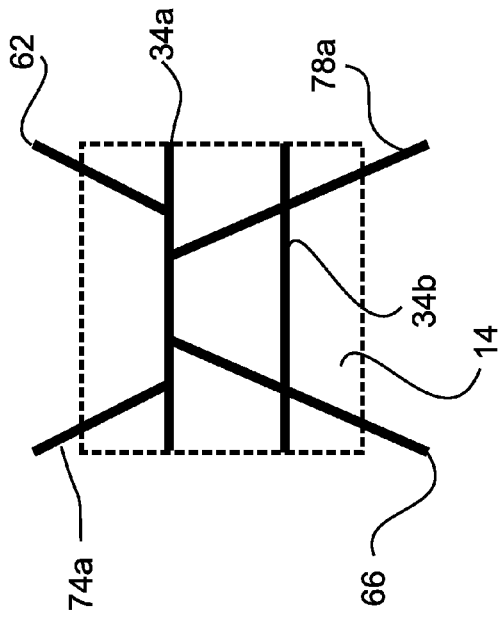
FIG. 9A is a sketch from the top of this invention illustrating one variation in attachment of the top support.
Figure 9C:
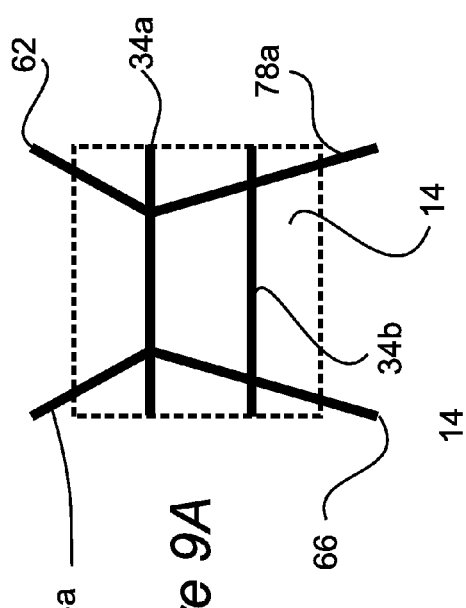
FIG. 9C is a sketch from the top of this invention illustrating yet another variation in attachment of the top support.
Figure 9B:
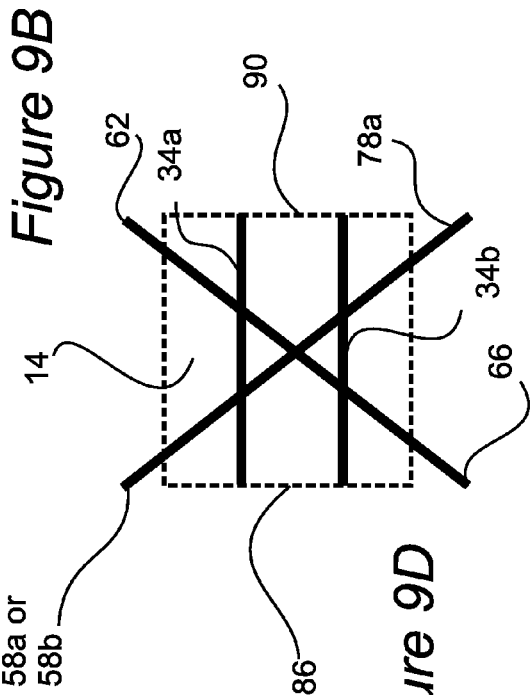
FIG. 9B is a sketch from the top of this invention illustrating another variation in attachment of the top support.
Figure 9D:
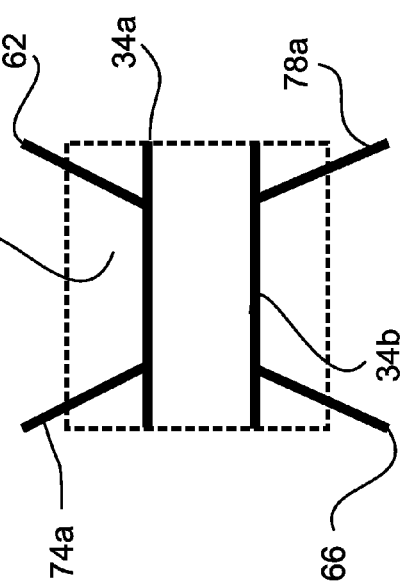
FIG. 9D is a sketch from the top of this invention illustrating yet another variation in attachment of the top support.
Figure 9E:
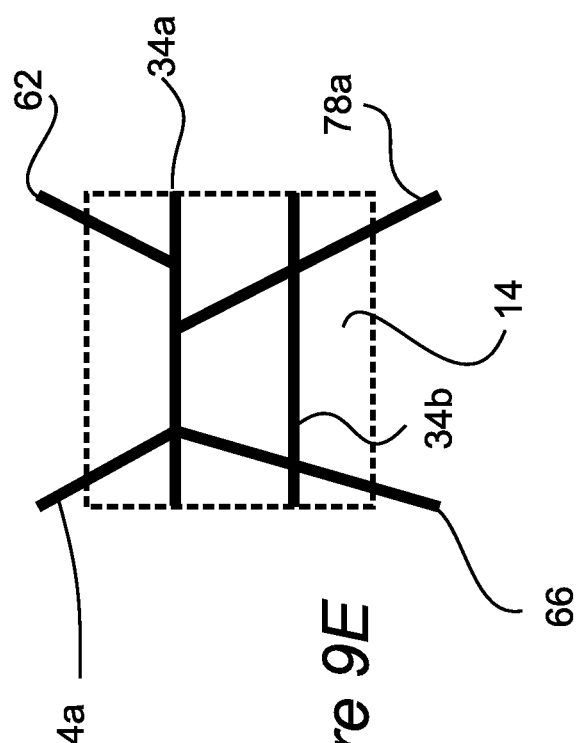
FIG. 9E is a sketch from the top of this invention illustrating yet another variation in attachment of the top support.

There are a multitude of other variations of this invention. FIG. 7 shows the usual case in which the top 58a and bottom 58b straps run normal to the supports 34a, 34b at their ends 82a, 82b. FIG. 9A-9E are sketches from the top of this invention illustrating variation in attachment of the top straps 58a. In all of FIGS. 9A-9D, the straps 58a run at an angle to the supports 34a, 34b. While particular angles are shown, it will be obvious that there can be considerable variation on the angle. In FIG. 9A the gently pitched and steeply pitched sections meet at the peak support and the angles that the steeply pitched 74a and gently pitched 78a sections make with the supports 34a, 34b are supplementary to each other. In FIG. 9B the gently pitched 78a and steeply pitched 74a sections are separated at the peak support 34a. In FIG. 9C the gently pitched sections 78a only run to the supplementary support 34b and the steeply pitched sections 74a only run to the peak support 34a. In FIG. 9D the top straps 58a run straight from the first point 62 on one end 86 of the solar panel 14 to the second point 66 on the other end 90 of the solar panel 14 and vice versa. It will be obvious that the bottom straps 58b can also run straight from the first point 62 on one end 86 of the solar panel 14 to the second point 66 on the other end 90 of the solar panel 14 and vice versa. Many other variations of these schemes, including their combinations are possible. For example see FIG. 9E. Moreover, the straps 58a, 58b do not have to be straight. They can be curved, trace a zigzag path, trace a sinusoidal path, etc.

Figure 10:
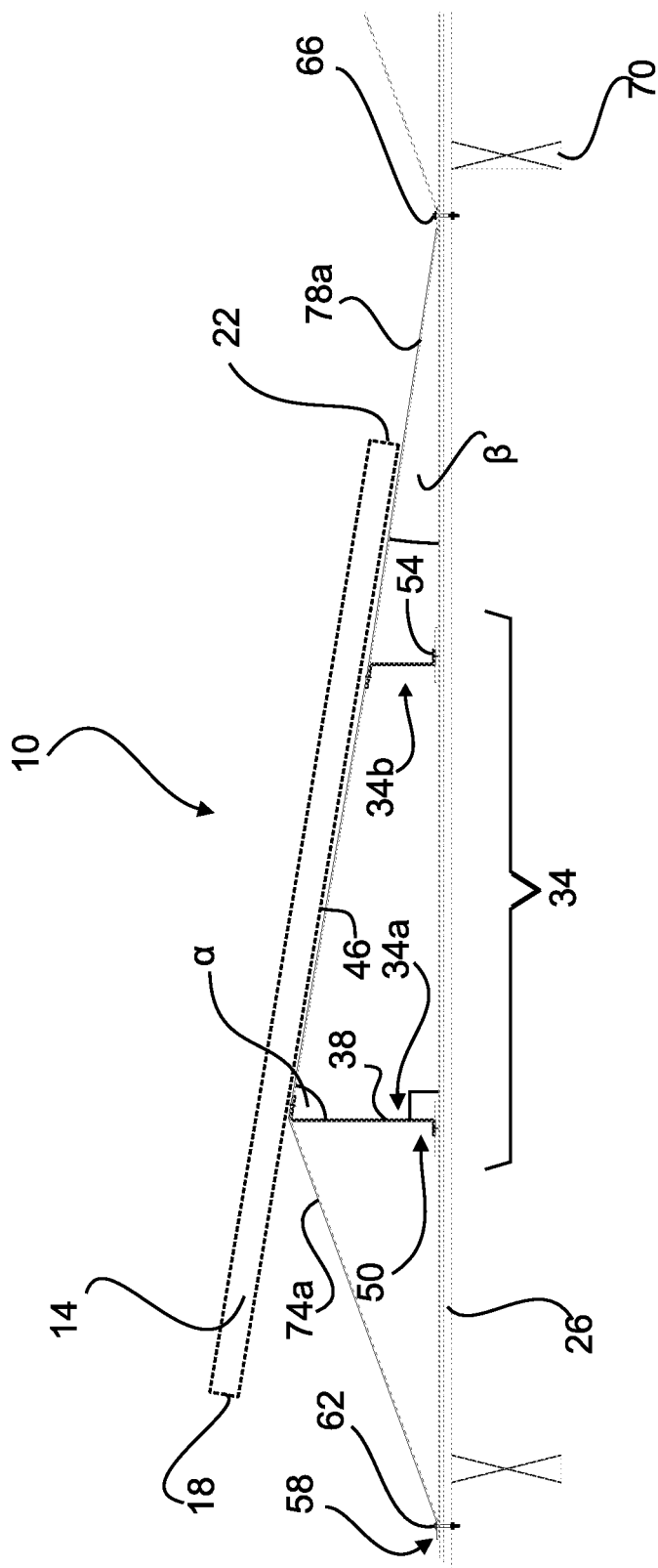
FIG. 10 is a side, cross sectional view of slightly more than one unit of one embodiment of this invention installed on a surface and supporting a solar panel. This embodiment has a top strap and a bottom strap and two supports and is attached to the surface and not to the joists.

FIG. 10 illustrates how this invention 10 can be attached to the surface and not just to the joists 70 or beams. The embodiment illustrated has a top strap 58a and a bottom strap 58b, a peak support 34a and a supplemental support 34b. However, this means of surface attachment can be applied to any embodiment or variation of this invention; for example, those shown in FIGS. 5, 6 and 14

Figure 11A:
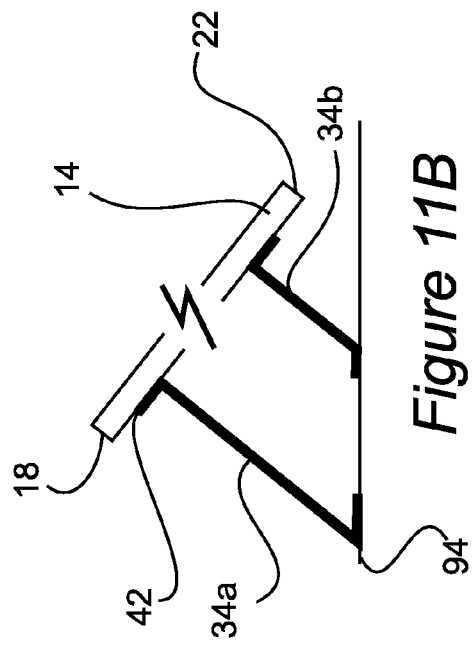
FIG. 11A is a cross sectional sketch illustrating this invention with two vertical supports of equal height. The top flanges point towards the sides of the solar panel.
Figure 11B:
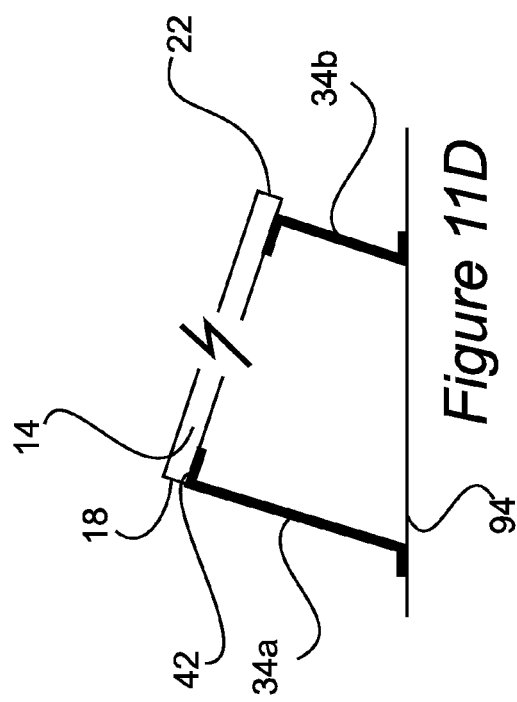
FIG. 11B is a cross sectional sketch illustrating this invention with two supports at the same angle to the vertical yet normal to the solar panel, of different heights. The top flanges point towards the sides of the solar panel.
Figure 11C:
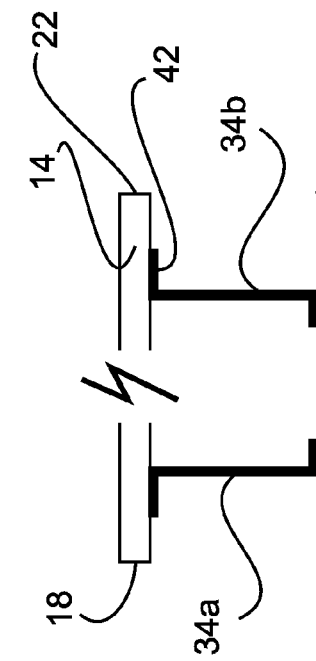
FIG. 11C is a cross sectional sketch illustrating this invention with two supports at different angles to the vertical and to the solar panel, of different heights. The top flanges point towards the sides of the solar panel.
Figure 11D:
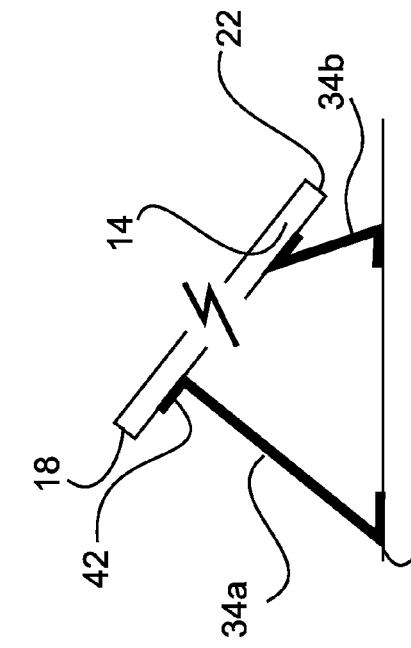
FIG. 11D is a cross sectional sketch illustrating this invention with two supports at the same angle to the vertical yet normal to the solar panel, of different heights. The top flanges point away from the sides of the solar panel.

In the usual case the peak 34a and supplemental 34b supports are normal to the surface 94 and the peak support 34a is taller than the supplemental support 34b, as illustrated in FIGS. 1, 5, 6 and 7. But this does not have to be the case. FIGS. 11A-11D illustrate some variations on this theme. FIG. 11A shows the peak 34a and supplemental 34b supports normal to the surface 94 and of equal height. The top flanges 42 point towards the sides 18, 22 of the solar panel 14. FIG. 11B shows the peak 34a and supplemental 34b supports at the same angle to the surface 94 yet normal to the solar panel 14, of different heights. The top flanges 42 point towards the sides 18, 22 of the solar panel 14. FIG. 11C shows the peak 34a and supplemental 34b supports at different angles to the surface 94 and to the solar panel 14, of different heights. The top flanges 42 point towards the sides 18, 22 of the solar panel 14. FIG. 11D shows the peak 34a and supplemental 34b supports at the same angle to the surface 94 yet normal to the solar panel 14, of different heights. The top flanges 42 point away from the sides 18, 22 of the solar panel 14. Many other variations of these schemes, including their combinations are possible. Moreover, the supports 34a, 34b do not have to be straight. They can be curved, trace a zigzag path, trace a sinusoidal path, etc.

Figure 12:
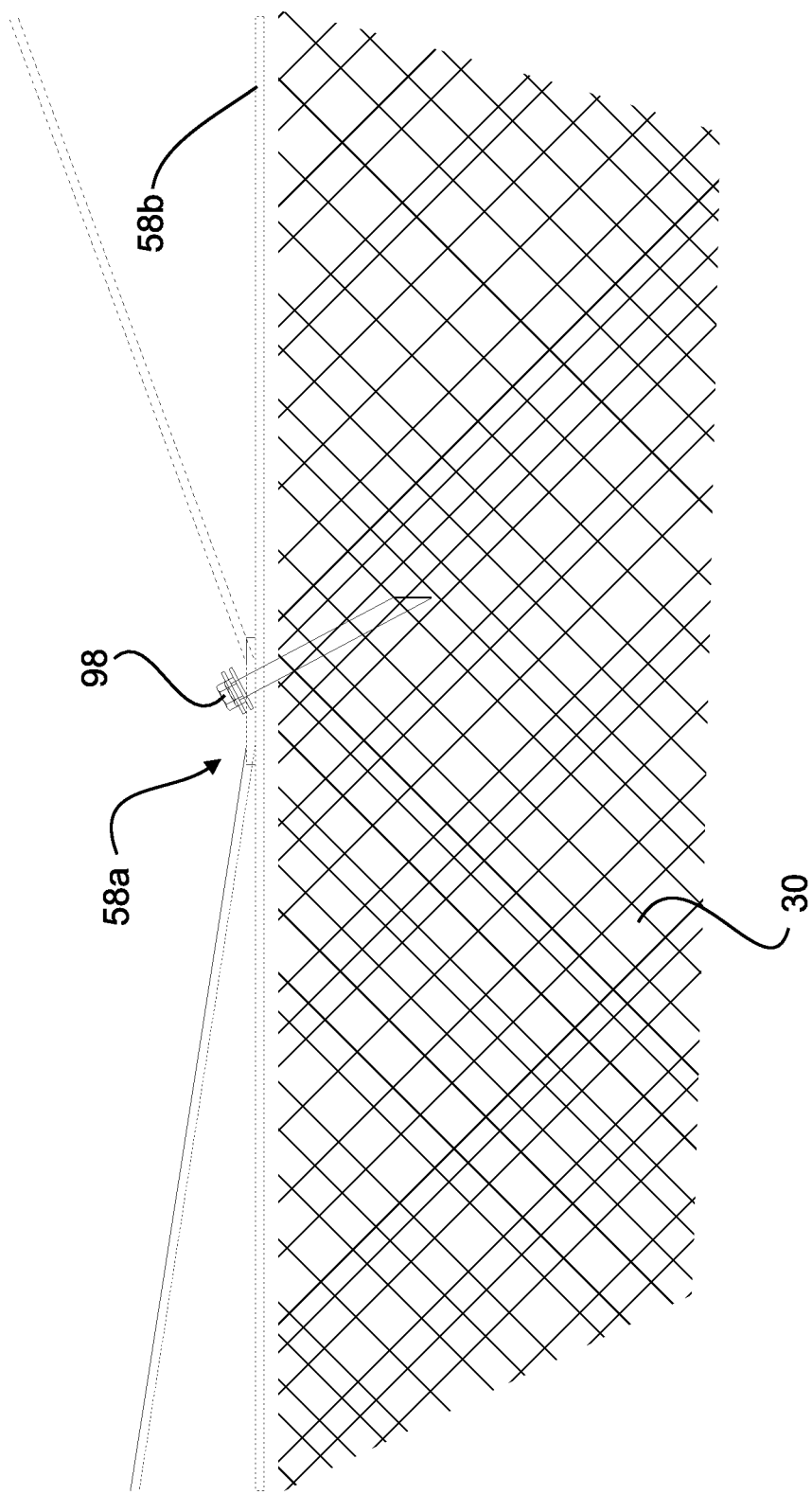
FIG. 12 shows attachment of straps to the ground with a pin or peg.

FIG. 12 shows attachment of straps 58a, 58b to the ground 30 with a pin or peg 98. The pin 98 is rammed or hammered into the ground 30 and retains the invention 10 in a manner similar to the retention of a tent with a tent peg.

The supports 34a or 34b in FIGS. 1-12 are all zig-zag shaped. FIGS. 13A-13D illustrate various other shapes that the supports 34a or 34b can have.

FIG. 13A illustrates a support 34a or 34b with a C shape, including an angled top flange.

FIG. 13B illustrates a support 34a or 34b with an angled Π shape.

FIG. 13C illustrates a support 34a or 34b with an inverted T shape.

FIG. 13D illustrates a support 34a or 34b with an I shape and an angled top flange.

FIG. 13E illustrates a support 34a or 34b with an inverted, Π shape with angled top flanges.

FIG. 13F illustrates a support 34a or 34b with an inverted Π shape and parallel top flanges.

Figure 14:
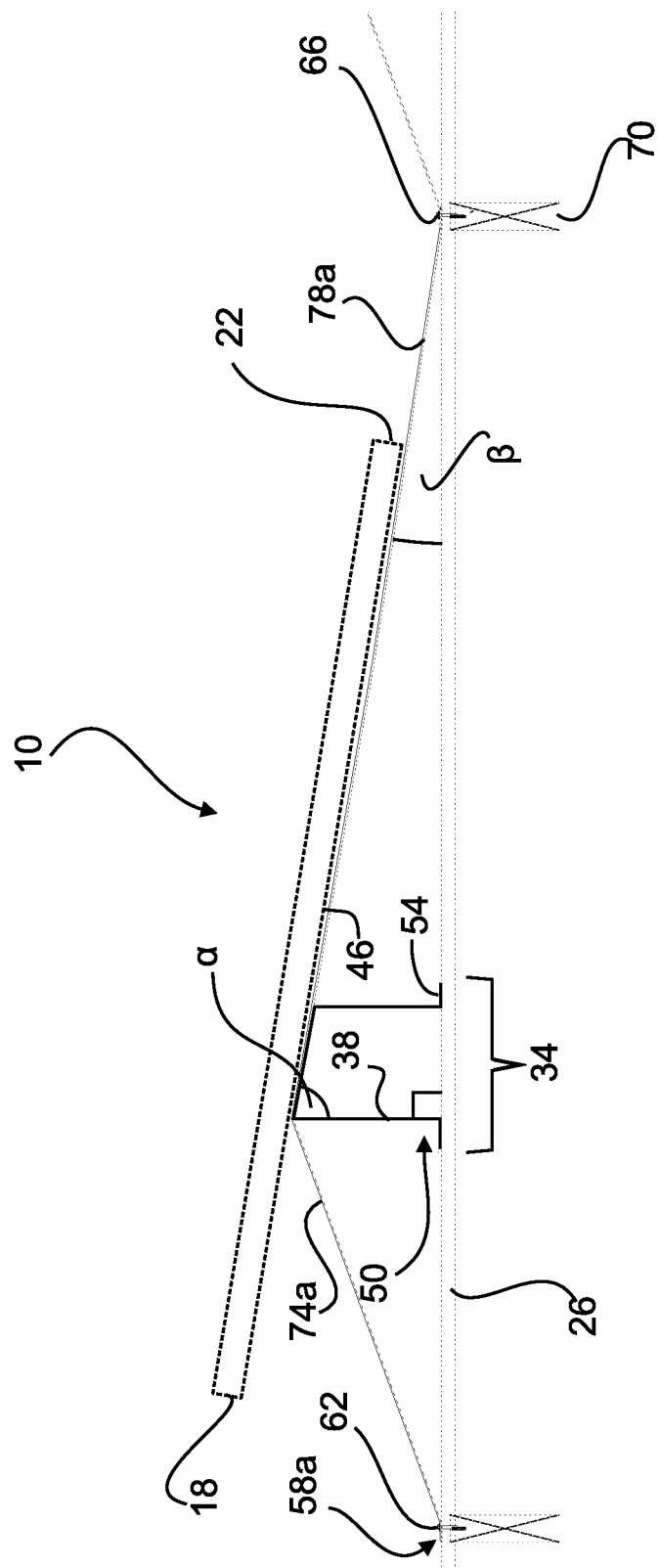
FIG. 14 is a side, cross sectional view of slightly more than one unit of one embodiment of this invention installed on a roof and supporting a solar panel. This embodiment has a top strap, and a single, angled, Π shaped support and is attached to the roof joists.

FIG. 14 is a side, cross sectional view of slightly more than one unit of one embodiment of this invention 10 installed on a roof 26 and supporting a solar panel 14. This embodiment has a top strap 58a, and a single, angled, Π shaped support 34 and is attached to the roof joists 70.

This novel mounting system 10 may be fabricated on site or provided as a kit. First the strap 58 and support 34 are fabricated. Then the strap 58 is attached to the surface 94 between the two points 62, 66 and the support 34 is attached to the strap 58. Finally the solar panel 14 is attached to the top flange 42 of the support 58.

Preferably, there is a peak support 34a and an intermediate support 34b. Preferably there is a top strap 58a and a bottom strap 58b. In this case, the bottom strap 58b is attached to the surface 94 between the two points 62, 66. If the surface is a roof 26 or wall, such attachment is made by screws, bolts, or studs and preferably into underlying joists 70 or beams. If the surface is the ground 30, attachment is made means of driven pins or pegs 98.

Then the supports 34a, 34b are attached to the bottom strap 58b, preferably via their bottom flanges 54. Attachment may be via screw, bolt, stud, adhesive, clamping, welding, etc. In addition, the bottom 50 of each support 34 may be attached to the surface.

Next the top strap 58a is run over the tops of the supports 34a, 34b and attached to their top flanges 42. Attachment is preferably made via screw, bolt, stud, or clamping. Finally, the solar panels are positioned and attached to the top flanges 42. Attachment is preferably made via screw, bolt, stud, or clamping.

There are at least 48 variations of this invention 10. The support can be singular 34 or in two parts 34a, 34b. The strap can be at the top 58a, at the bottom 58b or both. The top strap 58a can be normal to the supports 34a, 34b or at an angle to them. The top strap 58a can be continuous and or in two separate parts. In addition there are many possible patterns for attaching the bottom strap 58b between the two points 62, 66.

The following reference numerals are used on FIGS. 1 through 14:
 10 novel solar mounting system of this invention
 14 solar panel
 18 upper side of solar panel
 22 lower side of solar panel
 26 roof
 30 ground
 34 support
 34a peak support
 34b intermediate support
 38 central member of support
 42 top flange of support
 46 bottom of solar panel
 50 bottom of support
 54 bottom flange of support
 58 strap
 58a top or first strap
 58b bottom or second strap
 60 top surface of strap
 62 first point on surface
 66 second point on surface
 70 joist or beam
 74 steeply pitched section of strap
 74a steeply pitched section of top strap
 76 weep hole
 78 gently pitched section of strap
 78a gently pitched section of top strap 82a one end of support
82b other end of support
86 one end of solar panel
90 other end of solar panel
94 surface
98 pin or peg
α angle between the top flange and the central member
β angle between the surface and the bottom of the solar panel
W width of strap
L length of support Thus, the present invention has been described herein with reference to particular embodiments for particular applications. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A mounting system for a solar panel, said solar panel having an upper side and a lower side, comprising:
   a) a first strap;
   b) a second strap; said first strap directly above said second strap and extending along the same direction as said second strap;
   c) a support adapted to separate said first strap from said second strap; said support having a top flange, a bottom and an end;
   d) said first strap attached to said top flange and said second strap attached to said bottom;
   e) a first attachment attaching said straps to a surface at a first point on said surface; and
   f) a second attachment attaching said straps to said surface at a second point on said surface; said first and second points being spaced apart; said support being between said first and second points;
   said first and second straps forming a triangular configuration, whereby said first strap is divided into a steeply pitched section and a gently pitched section; said gently pitched section for mounting said solar panel.

2. A system as claimed in claim 1 in which said top flange is parallel to said surface.

3. A system as claimed in claim 1 in which said top flange is at an angle to said surface.

4. A system as claimed in claim 1 in which the cross section of said first strap and said second strap is rectangular.

5. A system as claimed in claim 1 in which the cross section of said first and said second strap is C-shaped.

6. A system as claimed in claim 1 in which the cross section of said first and said second strap is zig-zag shaped.

7. A system as claimed in claim 1 in which the cross section of said first and said second strap is I-shaped.

8. A system as claimed in claim 1 in which a top surface of said first or said second strap is curved.

9. A system as claimed in claim 1 in which said support comprises a first support and a second support spaced apart from each other.

10. A system as claimed in claim 9 in which the cross-section of said first support is a zig-zag shape.

11. A system as claimed in claim 9 in which the cross-section of said first support is a C shape.

12. A system as claimed in claim 9 in which the cross-section of said first support is a Π shape.

13. A system as claimed in claim 9 in which the cross-section of said first support is an inverted T shape.

14. A system as claimed in claim 9 in which the cross-section of said first support is an I shape.

15. A system as claimed in claim 9 in which the cross-section of said second support is a zig-zag shape.

16. A system as claimed in claim 9 in which the cross-section of said second support is a C shape.

17. A system as claimed in claim 9 in which the cross-section of said second support is a Π shape.

18. A system as claimed in claim 9 in which the cross-section of said second support is an inverted T shape.

19. A system as claimed in claim 9 in which the cross-section of said second support is an I shape.

20. A system as claimed in claim 1 in which said first strap is attached to said top flange at said end.

21. A system as claimed in claim 1 in which said first strap is attached to said top flange normal to said support.

22. A system as claimed in claim 1 in which said first strap is attached to said top flange at an angle to said support.

23. A system as claimed in claim 1 in which the cross-section of said support is a zig-zag shape.

24. A system as claimed in claim 1 in which the cross-section of said support is a C shape.

25. A system as claimed in claim 1 in which the cross-section of said support is a Π shape.

26. A system as claimed in claim 1 in which the cross-section of said support is an inverted T shape.

27. A system as claimed in claim 1 in which the cross-section of said support is an I shape.

28. A system as claimed in claim 1 in which the length of said support is greater than the width of said first and said second strap.

29. A method of mounting a solar panel, said solar panel having an upper side and a lower side, comprising the steps of:
   a) providing a first strap;
   b) providing a second strap;
   c) locating said first strap directly above said second strap and extending said first strap along the same direction as said second strap;
   d) providing a support adapted to separate said first strap from said second strap; said support having a top flange, a bottom and an end;
   e) attaching said first strap to said top flange;
   f) attaching said second strap to said bottom;
   g) attaching said straps to a first point on a surface and a second point on said surface; said points being spaced apart; said support being between said first and second points;
   said first and second straps forming a triangular configuration, whereby said first strap is divided into a steeply pitched section and a gently pitched section; said gently pitched section for mounting said solar panel.

30. A method as claimed in claim 29 in which said top flange is parallel to said surface.

31. A method as claimed in claim 29 in which said top flange is at an angle to said surface.

32. A method as claimed in claim 29 in which the cross section of said first strap and said second strap is rectangular.

33. A method as claimed in claim 29 in which the cross section of said first and said second strap is C-shaped.

34. A method as claimed in claim 29 in which the cross section of said first and said second strap is Z-shaped.

35. A method as claimed in claim 29 in which the cross section of said first and said second strap is I-shaped.

36. A system as claimed in claim 29 in which a top surface of said first or said second strap is curved.

37. A method as claimed in claim 29 in which said support comprises a first support and a second support spaced apart from each other.

38. A method as claimed in claim 37 in which the cross-section of said first support is a zig-zag shape.

39. A method as claimed in claim 37 in which the cross-section of said first support is a C shape.

40. A method as claimed in claim 37 in which the cross-section of said first support is a Π shape.

41. A method as claimed in claim 37 in which the cross-section of said first support is an inverted T shape.

42. A method as claimed in claim 37 in which the cross-section of said first support is an I shape.

43. A method as claimed in claim 37 in which the cross-section of said second support is a zig-zag shape.

44. A method as claimed in claim 37 in which the cross-section of said second support is a C shape.

45. A method as claimed in claim 37 in which the cross-section of said second support is a Π shape.

46. A method as claimed in claim 37 in which the cross-section of said second support is an inverted T shape.

47. A method as claimed in claim 37 in which the cross-section of said second support is an I shape.

48. A method as claimed in claim 29 in which said first strap is attached to said top flange at said end.

49. A method as claimed in claim 29 in which said first strap is attached to said top flange normal to said support.

50. A method as claimed in claim 29 in which said first strap is attached to said top flange at an angle to said support.

51. A method as claimed in claim 29 in which the cross-section of said support is a zig-zag shape.

52. A method as claimed in claim 29 in which the cross-section of said support is a C shape.

53. A method as claimed in claim 29 in which the cross-section of said support is a Π shape.

54. A method as claimed in claim 29 in which the cross-section of said support is an inverted T shape.

55. A method as claimed in claim 29 in which the cross-section of said support is an I shape.

56. A method as claimed in claim 29 in which the length of said support is greater than the width of said first and said second strap.

* * * * *